(12) United States Patent
Liu et al.

(10) Patent No.: US 9,080,586 B2
(45) Date of Patent: Jul. 14, 2015

(54) D-TYPE SCREWING ASSEMBLY FOR FURNITURE

(71) Applicants: Min-Sheng Liu, Guangdong (CN); Lei Cao, Guangdong (CN); Jie Liu, Guangdong (CN)

(72) Inventors: Min-Sheng Liu, Dongguan (CN); Lei Cao, Dongguan (CN)

(73) Assignees: Min-Sheng Liu, Guangdong (CN); Lei Cao, Guangdong (CN); Jie Liu, Guangdong (CN)

( * ) Notice: Subject to any disclaimer, the term of this patent is extended or adjusted under 35 U.S.C. 154(b) by 0 days.

(21) Appl. No.: 13/681,571

(22) Filed: Nov. 20, 2012

(65) Prior Publication Data

US 2014/0140758 A1    May 22, 2014

(51) Int. Cl.
| F16B 12/00 | (2006.01) |
| F16B 12/14 | (2006.01) |
| F16B 23/00 | (2006.01) |

(52) U.S. Cl.
CPC ............. *F16B 12/00* (2013.01); *F16B 12/14* (2013.01); *F16B 23/0069* (2013.01); *Y10T 403/56* (2015.01)

(58) Field of Classification Search
CPC ............. F16B 12/2009; F16B 12/2054; F16B 12/2063; F16B 12/02; F16B 12/14; F16B 2012/04; F16B 2012/145; F16B 2012/106; F16B 23/007; F16B 23/0046; F16B 23/0069; Y10S 411/919; Y10S 403/12; B25B 13/485; B25B 15/004
USPC ............. 411/403; 403/205, 231, DIG. 10, 403/DIG. 12, DIG. 13
See application file for complete search history.

(56) References Cited

U.S. PATENT DOCUMENTS

| 218,142 | A | * | 8/1879 | Schowe | 411/403 |
| 255,459 | A | * | 3/1882 | Rogers | 411/403 |
| 452,640 | A | * | 5/1891 | Gerry | 411/403 |
| 735,143 | A | * | 8/1903 | Parker | 16/220 |
| 2,169,460 | A | * | 8/1939 | Broughton | 411/403 |
| 3,073,206 | A | * | 1/1963 | Rudolph | 411/410 |
| 3,106,862 | A | * | 10/1963 | Briles | 411/403 |
| 3,304,561 | A | * | 2/1967 | Ellsworth | 470/63 |
| 3,449,988 | A | * | 6/1969 | Gallo, Sr. | 81/176.15 |
| 3,456,969 | A | * | 7/1969 | Wittenmayer | 403/231 |
| 3,695,321 | A | * | 10/1972 | Garehime, Jr. | 81/448 |
| 3,695,655 | A | * | 10/1972 | Wippermann | 403/403 |
| 3,835,610 | A | * | 9/1974 | Harper et al. | 403/231 |

(Continued)

FOREIGN PATENT DOCUMENTS

GB    2039659 A  *  8/1980  ............. F16B 12/14

*Primary Examiner* — Joshua Kennedy
(74) *Attorney, Agent, or Firm* — Alan D. Kamrath; Kamrath IP Lawfirm, P.A.

(57) ABSTRACT

A D-type screwing assembly for furniture contains a retaining member including a hole defined in the retaining member, with a plurality of ribs defined on two sides of the retaining member, and with a slot formed on a top end of the retaining member. A screw member includes at least two orifices defined on a head end of the screw member and a thread section formed on the screw member to screw with the hole of the retaining member. A rotary member includes at least two posts extending outwardly from a front end of the rotary member, with a number of the at least two posts corresponding to that of the at least two orifices of the screw member, so that the at least two posts of the rotary member are fitted into the at least two orifices of the screw member correspondingly.

16 Claims, 11 Drawing Sheets

(56) References Cited

U.S. PATENT DOCUMENTS

| | | | |
|---|---|---|---|
| 3,951,558 A * | 4/1976 | Komarov | 403/231 |
| 3,963,322 A * | 6/1976 | Gryctko | 439/814 |
| 4,625,599 A * | 12/1986 | Icard | 81/461 |
| 4,657,423 A * | 4/1987 | Neese et al. | 403/21 |
| 5,368,426 A * | 11/1994 | Reeves | 411/104 |
| 6,126,355 A * | 10/2000 | Clover, Jr. | 403/13 |
| 6,350,092 B1 * | 2/2002 | Powell | 411/82 |
| 6,478,518 B1 * | 11/2002 | Hwang | 411/104 |
| 6,755,836 B1 * | 6/2004 | Lewis | 606/916 |
| 8,162,559 B2 * | 4/2012 | Krige | 403/259 |
| 2005/0152770 A1 * | 7/2005 | Tschakaloff et al. | 411/403 |
| 2011/0058896 A1 * | 3/2011 | Krige | 403/408.1 |

* cited by examiner

D-TYPE SCREWING ASSEMBLY FOR FURNITURE

BACKGROUND OF THE INVENTION

1. Field of the Invention

The present invention relates to a D-type screwing assembly for furniture which is capable of connecting a first wooden component with a second wooden component of wooden furniture (such as a cabinet), so that at least one rotary member is screwed with at least one screw member easily.

2. Description of the Prior Art

There are many manners to connect components of wooden products (such as furniture, cabinets, etc.) together. For example, latches are used to connect two abutting wooden components together. A wooden component has a peripheral slot formed on a peripheral side thereof, and another wooden component has a peripheral rib formed on a peripheral side thereof to retain with the slot, thus connecting these two wooden components together. However, such connecting manners still have many defects.

The present invention has arisen to mitigate and/or obviate the afore-described disadvantages.

SUMMARY OF THE INVENTION

The primary object of the present invention is to provide a D-type screwing assembly for furniture which is capable of connecting a first wooden component with a second wooden component of wooden furniture (such as a cabinet), so that at least one rotary member is screwed with at least one screw member easily.

A D-type screwing assembly for furniture provided by the present invention contains:

a retaining member including a hole defined in the retaining member, with a plurality of ribs defined on two sides of the retaining member, and with a slot formed on a top end of the retaining member;

a screw member including at least two orifices defined on a head end of the screw member and a thread section formed on the screw member to screw with the hole of the retaining member; and a rotary member including at least two posts extending outwardly from a front end of the rotary member, with a number of the at least two posts corresponding to that of the at least two orifices of the screw member so that the at least two posts of the rotary member are fitted into the at least two orifices of the screw member correspondingly.

Preferably, a shape of each post of the rotary member is selected from a polygonal column and a circular column.

Preferably, a shape of each orifice of the screw member corresponds to that of each post.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

The present invention will be clearer from the following description when viewed together with the accompanying drawings, which show, for purpose of illustration only, the preferred embodiments in accordance with the present invention.

Figure 1:
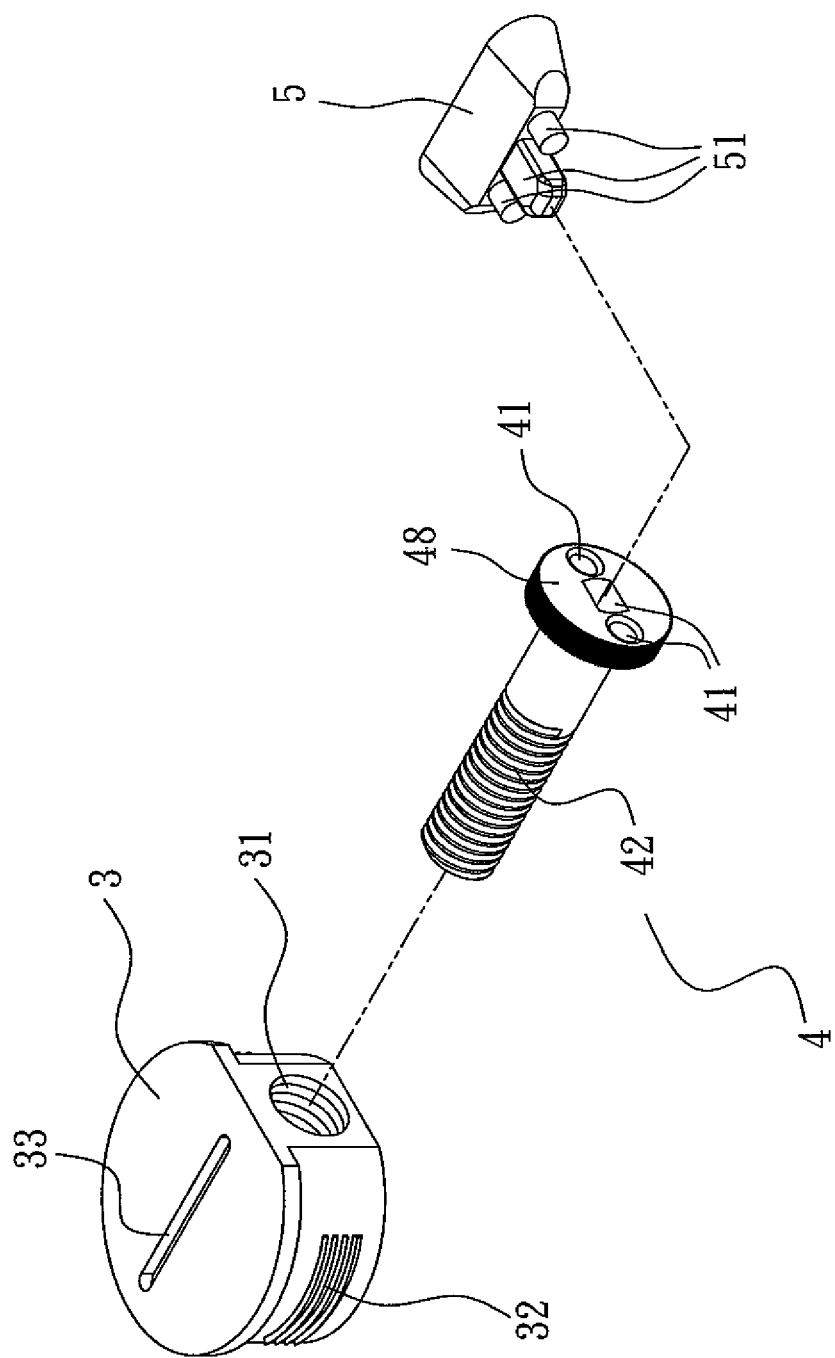
FIG. 1 is a perspective view showing the exploded components of a D-type screwing assembly for furniture according to a first embodiment of the present invention.
Figure 2:
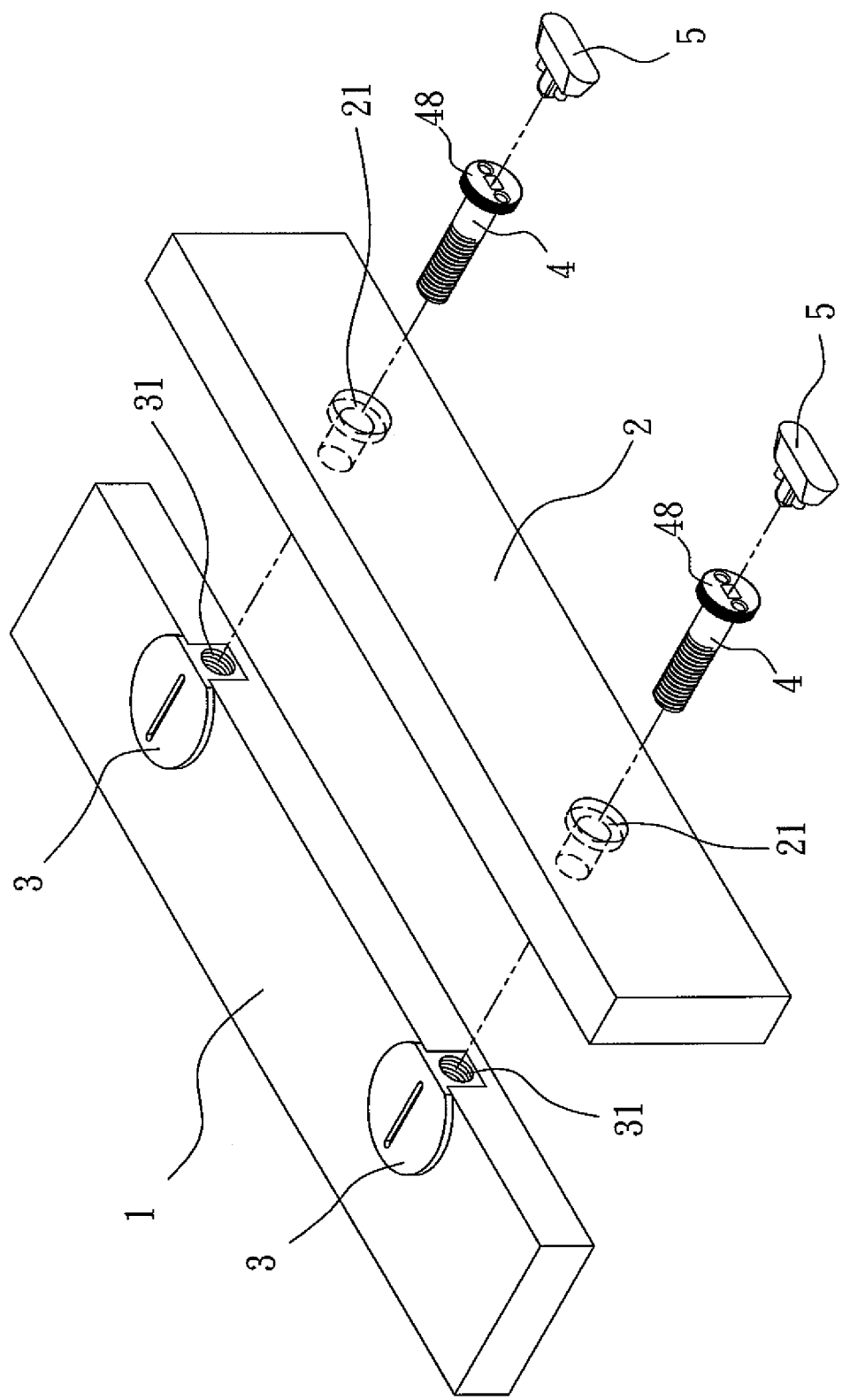
FIG. 2 is another perspective view showing the exploded components of the D-type screwing assembly for furniture according to the first embodiment of the present invention.

With reference to FIGS. 1 and 2, a D-type screwing assembly for furniture according to a first embodiment of the present invention comprises:

a retaining member 3 including a hole 31 defined in the retaining member 3, with a plurality of ribs 32 defined on two sides of the retaining member 3, and with a slot 33 formed on a top end of the retaining member 3;

a screw member 4 including at least two orifices 41 defined on a head end 48 of the screw member 4 and a thread section 42 formed on the screw member 4 to screw with the hole 31 of the retaining member 3; and a rotary member 5 including at least two posts 51 extending outwardly from a front end of the rotary member 5, with a number of the at least two posts 51 corresponding to that of the at least two orifices 41 of the screw member 4 so that the at least two posts 51 of the rotary member 5 are fitted into the at least two orifices 41 of the screw member 4 correspondingly.

Each post 51 of the rotary member 5 is a polygonal column or a circular column, and a shape of each orifice 41 of the screw member 4 corresponds to that of the each post 51.

Figure 3:
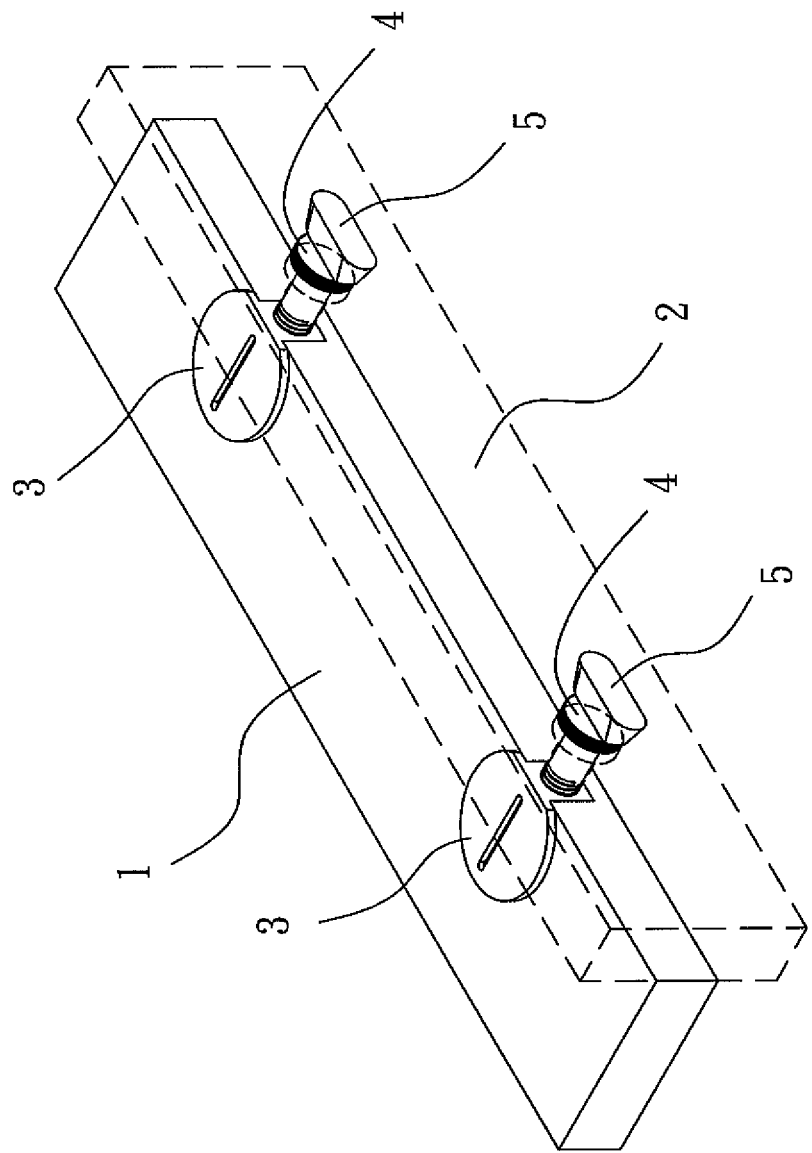
FIG. 3 is also another perspective view showing the assembly of the D-type screwing assembly for furniture according to the first embodiment of the present invention.
Figure 4:
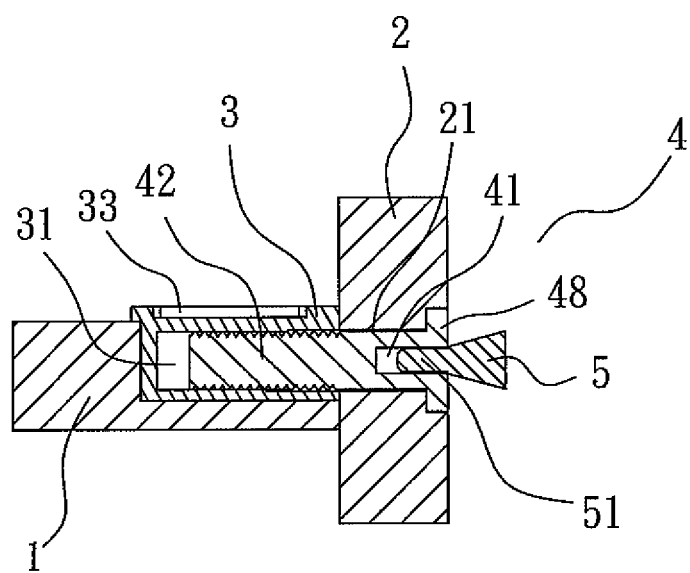
FIG. 4 is a cross sectional view showing the assembly of the D-type screwing assembly for furniture according to the first embodiment of the present invention.
Figure 5:
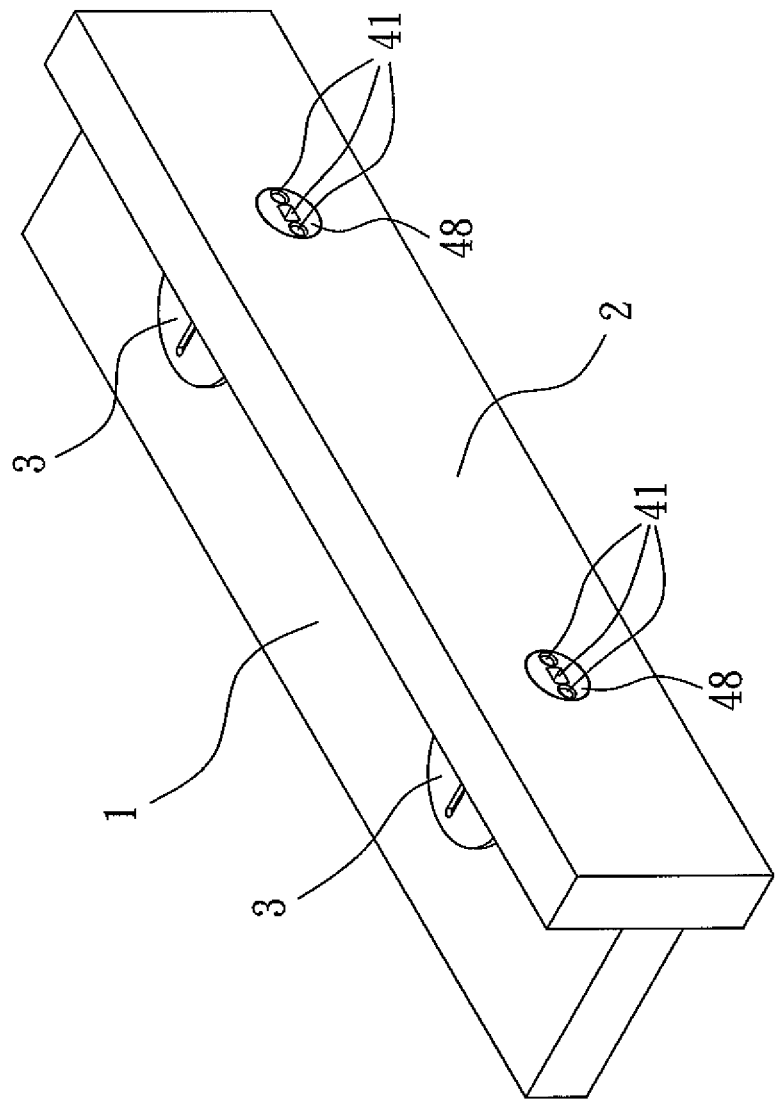
FIG. 5 is still another perspective view showing the assembly of the D-type screwing assembly for furniture according to the first embodiment of the present invention.

As shown in FIGS. 3-5, a first wooden component 1 is connected with a second wooden component 2. At least one retaining member 3 is fixed in at least one recess of the first wooden component 1. The slot 33 is used to adjust a direction of the at least one retaining member 3. The second wooden component 2 has a circular aperture 21 to fit with at least one screw member 4, so that the at least one screw member 4 is rotatably coupled with the at least one retaining member 3, thus connecting the first wooden component 1 with the second wooden component 2. Thereby, when a thread section 42 of the at least one screw member 4 is inserted through the second wooden component 2, the at least one screw member 4 is inserted through the circular aperture 21 of the second wooden component 2. Thereafter, thereafter the thread section 42 of the at least one screw member 4, which is inserted through the second wooden component 2, is screwed with the at least one retaining member 3. i.e., the thread section 42 of the at least one screw member 4 is fitted into a hole 31 of the at least one retaining member 3. Then, the at least two posts 51 of the at least one rotary member 5 are fitted into the at least two orifices 41 of the at least one screw member 4, and the at least one rotary member 5 is rotated so that the thread section 42 of the at least one crew member 4 is screwed in the hole 31 of the at least one retaining member 3. Hence, the first wooden component 1 and the second wooden component 2 of the wooden furniture (such as a cabinet) are connected together easily. In addition, when the at least one screw member 4 is rotatably screwed into the at least one retaining member 3, the at least one rotary member 5, which is fitted on the at least one screw member 4, is removed to store the at least one rotary member 5, thus saving using space.

Figure 6:
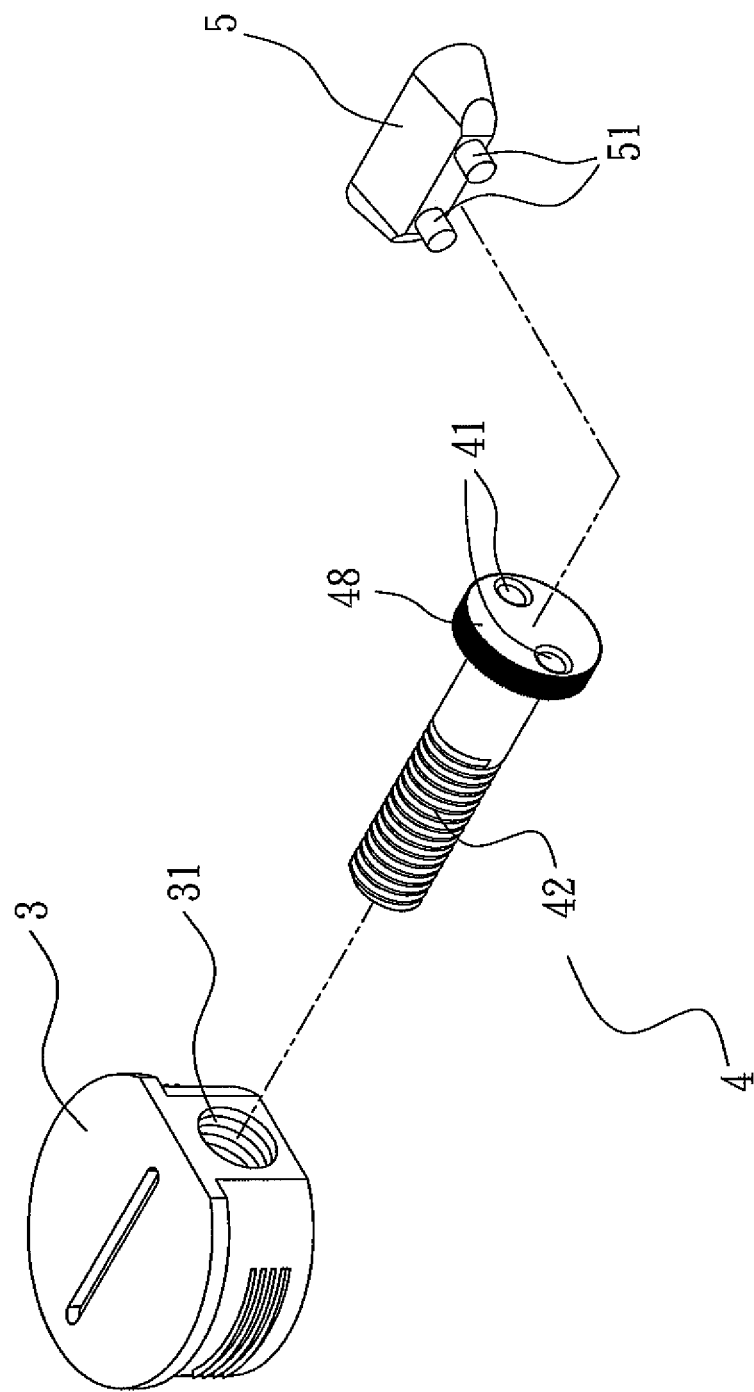
FIG. 6 is a perspective view showing two posts of a rotary member according to a second embodiment of the present invention.

As illustrated in FIG. 6, a number of the at least two posts 51 of the rotary member 5 of a D-type screwing assembly for furniture is two according to a second embodiment of the present invention.

Figure 7:
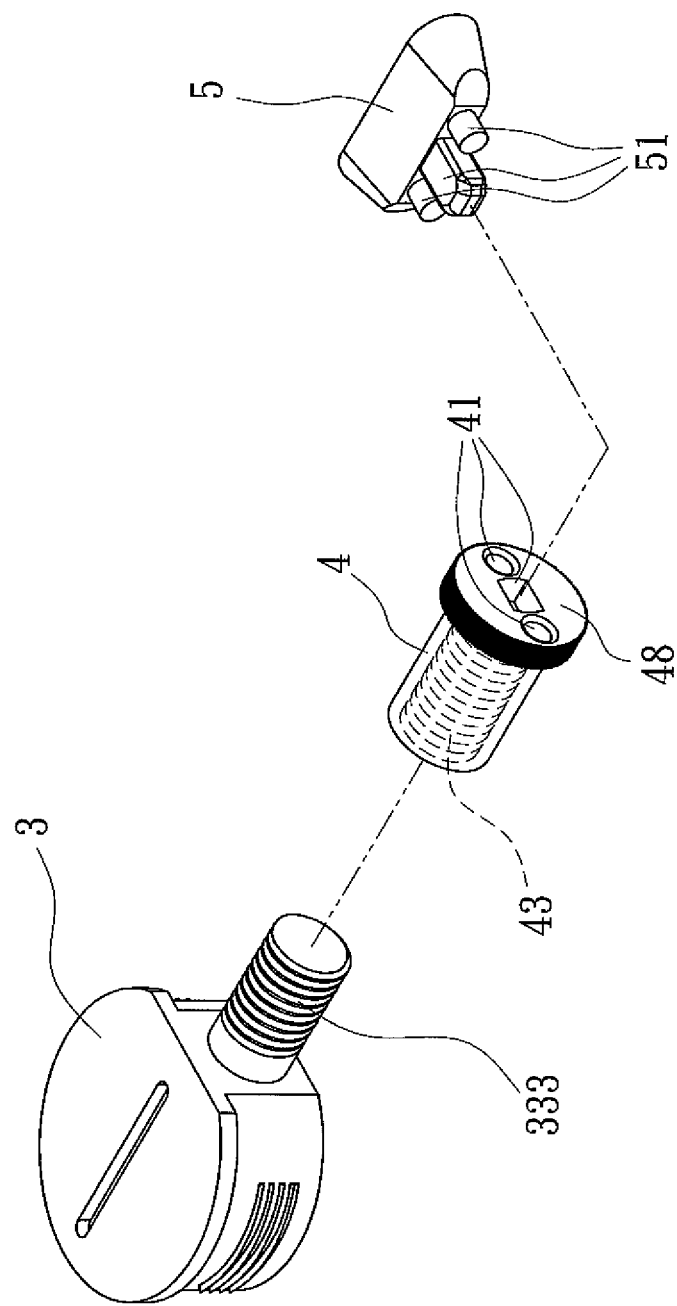
FIG. 7 is a perspective view showing a retaining member and a screw member of a D-type screwing assembly for furniture according to a third embodiment of the present invention.

FIG. 7 is a perspective view showing a retaining member 3 and a screw member 4 of a D-type screwing assembly for furniture according to a third embodiment of the present invention. The retaining member 3 includes a thread extension 333 extending outwardly therefrom, and the screw member 4 includes an opening 43 defined therein to mate with the thread extension 333 of the retaining member 3.

Figure 8:
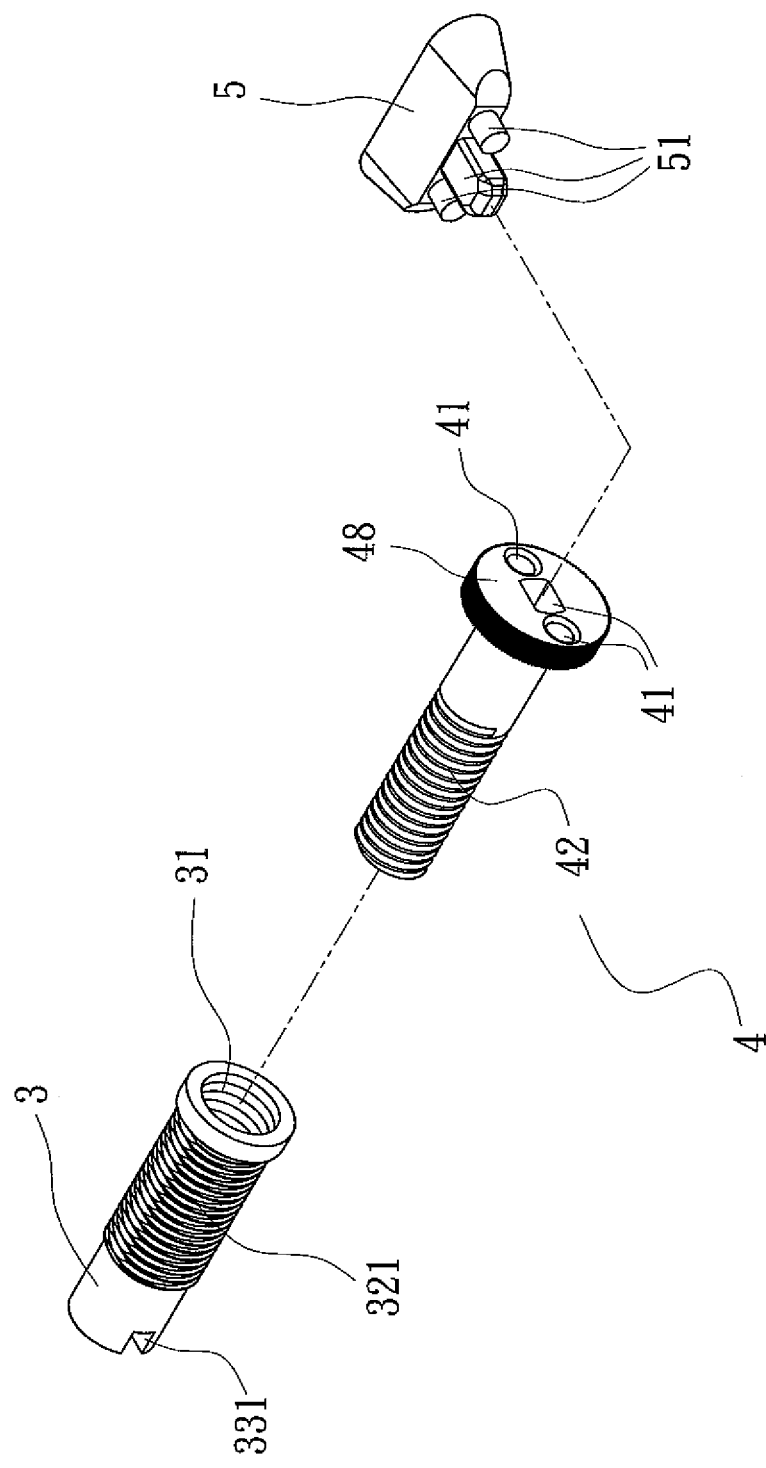
FIG. 8 is a perspective view showing a retaining member of a D-type screwing assembly for furniture according to a fourth embodiment of the present invention.

FIG. 8 is a perspective view showing a retaining member 3 and a screw member 4 of a D-type screwing assembly for furniture according to a fourth embodiment of the present invention. The retaining member 3 is a circular column and has a hole 31, with a plurality of ribs 321 arranged around an outer wall of the retaining member 3, and with a slot 331 formed on a distal end of the retaining member 3.

Figure 9:
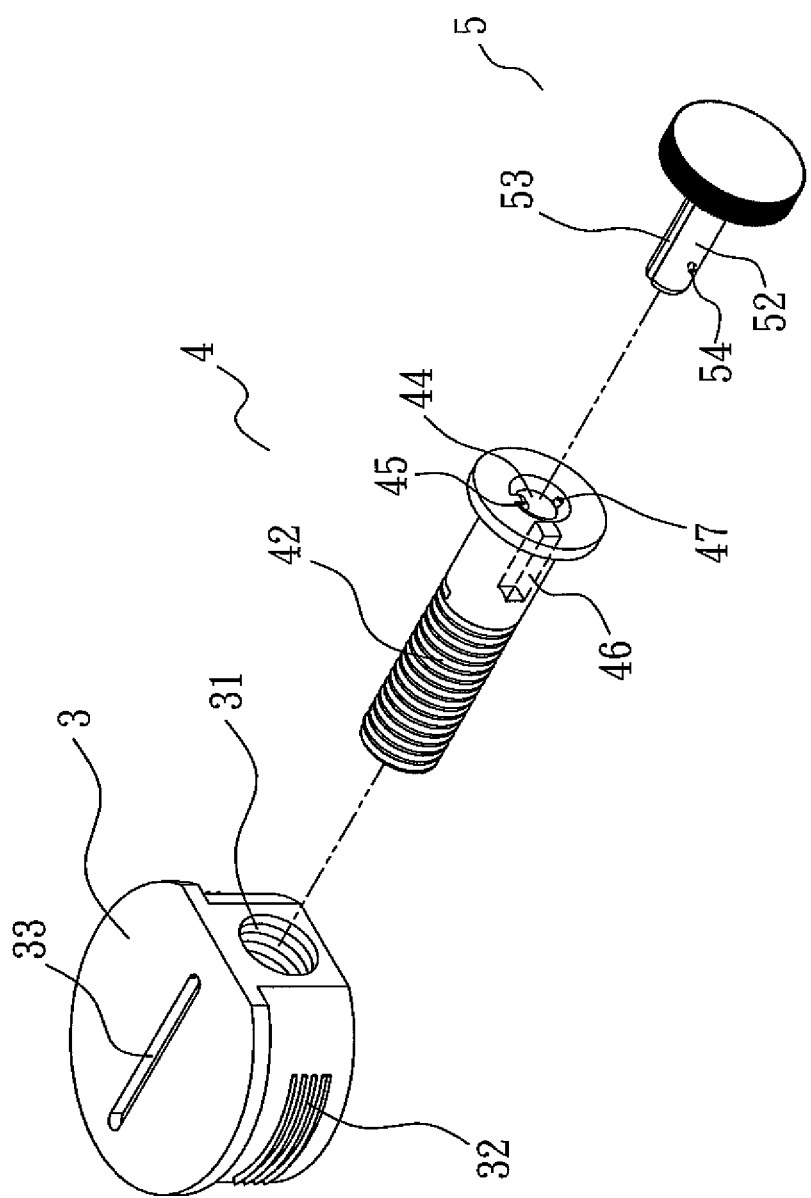
FIG. 9 is a perspective view showing a screw member and a rotary member of the D-type screwing assembly for furniture according to the fourth embodiment of the present invention.
Figure 10:
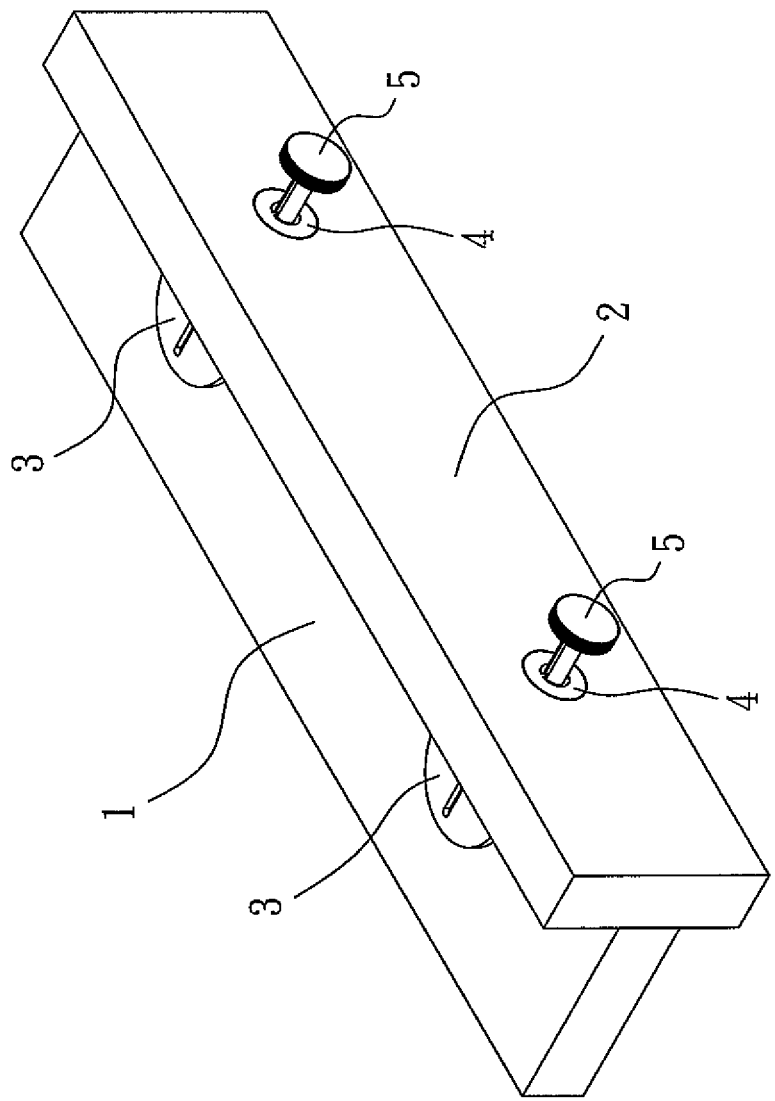
FIG. 10 is a perspective view showing the assembly of the D-type screwing assembly for furniture according to the fourth embodiment of the present invention.
Figure 11:
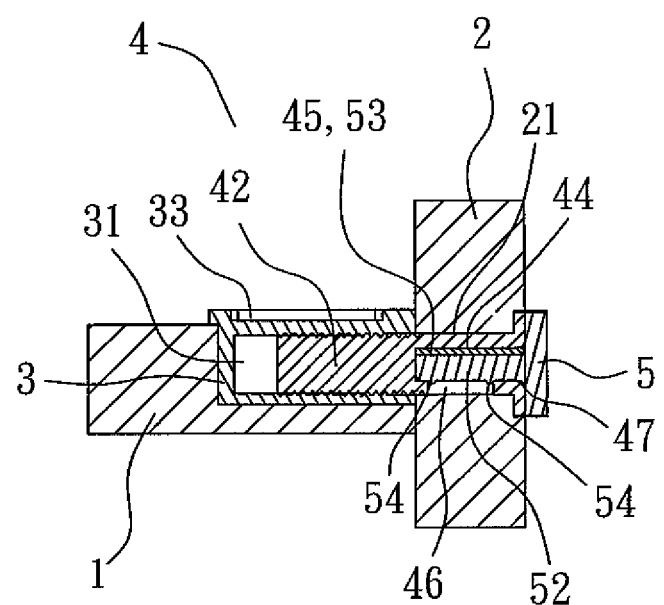
FIG. 11 is a cross sectional view showing the assembly of the D-type screwing assembly for furniture according to the fourth embodiment of the present invention.

With reference to FIGS. 9-11, the D-type screwing assembly for furniture according to the fourth embodiment of the present invention also comprises a screw member 4. The screw member 4 includes a cylinder bore 44 defined in a head end 48 thereof, with a rectangular portion 45 formed on one side of an inner wall of the cylinder bore 44, with a rectangular pore 46 arranged on another side of the inner wall of the cylinder bore 44 and communicating with the inner wall of the cylinder bore 44, and with a circular pore 47 defined on a front rim of the cylinder bore 44.

The D-type screwing assembly of the third embodiment also comprises a rotary member 5. The rotary member 5 includes an acting end 52, with a rectangular groove 53 formed on one side thereof, and with two semi-circular bosses 54 fixed on another side thereof.

Thereby, when a thread section 42 of the screw member 4 is inserted through a second wooden component 2, the screw member 4 is inserted into a circular aperture 21 of the second wooden component 2. Thereafter, the thread section 42 of the screw member 4 outside the first wooden component 1 is screwed with the retaining member 3, i.e., the thread section 42 of the screw member 4 outside the second wooden component 2 is fitted into the hole 31 of the retaining member 3. Then, the rotary member 5 is retained in the cylinder bore 44 of the screw member 4, and one semi-circular boss 54 of a front end of the rotary member 5 is fixed in the circular pore 47 of the screw member 4. The rectangular groove 53 of the rotary member 5 retains with the rectangular portion 45 of the screw member 4, and the rotary member 5 is rotated, so that the thread section 42 of the screw member 4 is rotatably screwed with the hole 31 of the retaining member 3. Hence, the first wooden component 1 and the second wooden component 2 of the wooden furniture (such as a cabinet) are connected together. Thereafter, the rotary member 5 is pushed into a bottom end of the cylinder bore 44, and the two semi-circular bosses 54 thereof are retained into the rectangular pore 46 of the screw member 4. Alternatively, the rotary member 5 is removed and then is stored, thus saving using space.

While various embodiments in accordance with the present invention have been shown and described, it is clear to those skilled in the art that further embodiments may be made without departing from the scope of the present invention.

What is claimed is:

1. A screwing assembly for furniture comprising:
a retaining member including an outer wall and a fastener defined in the retaining member, with the outer wall having generally circular cross sections having an axis, with a plurality of ribs defined on the retaining member, and with each of the plurality of ribs being arcuate about the axis, with the plurality of ribs being axially spaced along the axis, wherein a slot is formed on the retaining member;
a screw member including three orifices defined on a head end of the screw member and a thread section formed on the screw member to screw with the fastener of the retaining member; and
a rotary member including first, second and third posts extending outwardly from a front end of the rotary member, with the second post being intermediate and spaced from the first and third posts along a diametric line, wherein the first, second and third posts of the rotary member are fitted into the three orifices of the screw member correspondingly, with widths of the first, second and third posts perpendicular to the diametric line and parallel to the front end of the rotary member being equal; wherein the second post is a polygonal column and the first and third posts are circular columns.

2. The screwing assembly for furniture as claimed in claim 1, wherein the second post has cross sections larger than cross sections of the first and second posts parallel to the cross sections of the second post.

3. A screwing assembly for furniture comprising:
a retaining member including an outer wall and a fastener defined in the retaining member, with the outer wall having generally circular cross sections having an axis, with a plurality of ribs defined on the retaining member, and with each of the plurality of ribs being arcuate about the axis, with the plurality of ribs being axially spaced along the axis, wherein a slot is formed on the retaining member;
a screw member including three orifices defined on a head end of the screw member and a thread section formed on the screw member to screw with the fastener of the retaining member; and
a rotary member including first, second and third posts extending outwardly from a front end of the rotary member, with the second post being intermediate and spaced from the first and third posts along a diametric line, wherein the first, second and third posts of the rotary member are fitted into the three orifices of the screw member correspondingly, with widths of the first, second and third posts perpendicular to the diametric line and parallel to the front end of the rotary member being equal; wherein lengths of the first and third posts parallel to the diametric line and to the front end of the rotary member are equal, and wherein a length of the second post parallel to the diametric line and to the front end of the rotary member is greater than the lengths of the first and third posts.

4. The screwing assembly for furniture as claimed in claim 3, wherein a shape of each post of the rotary member is selected from a polygonal column and a circular column.

5. The screwing assembly for furniture as claimed in claim 3, wherein a shape of each orifice of the screw member corresponds to that of each post.

6. The screwing assembly for furniture as claimed in claim 3, wherein the fastener extends generally perpendicular to the axis, and with the slot extending radially relative to the axis.

7. The screwing assembly for furniture as claimed in claim 6, wherein the slot extends parallel to the fastener.

8. The screwing assembly for furniture as claimed in claim 7, wherein the plurality of ribs are circumferentially spaced.

9. The screwing assembly for furniture as claimed in claim 8, wherein the second post is a polygonal column and the first and third posts are circular columns.

10. The screwing assembly for furniture as claimed in claim 8, wherein the second post has cross sections larger than cross sections of the first and second posts parallel to the cross sections of the second post.

11. The screwing assembly for furniture as claimed in claim 3, wherein the fastener comprises a hole extending through the retaining member.

12. The screwing assembly for furniture as claimed in claim 3, wherein the fastener comprises a threaded extension extending radially from the outer wall.

13. The screwing assembly for furniture as claimed in claim 3, wherein the fastener comprises a hole extending in the retaining member parallel to the axis.

14. The screwing assembly for furniture as claimed in claim 13, wherein the slot extends radially relative to the axis.

15. The screwing assembly for furniture as claimed in claim 3, wherein the second post is a polygonal column and the first and third posts are circular columns.

16. The screwing assembly for furniture as claimed in claim 3, wherein the second post has cross sections larger than cross sections of the first and second posts parallel to the cross sections of the second post.

* * * * *